US010737507B2

(12) United States Patent
Iijima et al.

(10) Patent No.: US 10,737,507 B2
(45) Date of Patent: Aug. 11, 2020

(54) RELATIVE POSITION DETECTION METHOD, OPTICAL PRINT HEAD, AND IMAGE FORMING DEVICE

(71) Applicant: Konica Minolta, Inc., Chiyoda-ku Tokyo (JP)

(72) Inventors: Masayuki Iijima, Okazaki (JP); Takaki Uemura, Seto (JP); Makoto Obayashi, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/832,041

(22) Filed: Dec. 5, 2017

(65) Prior Publication Data
US 2018/0154655 A1    Jun. 7, 2018

(30) Foreign Application Priority Data
Dec. 7, 2016  (JP) ................... 2016-237450

(51) Int. Cl.
*B41J 2/45* (2006.01)
*G02B 19/00* (2006.01)

(52) U.S. Cl.
CPC .......... *B41J 2/451* (2013.01); *G02B 19/0061* (2013.01)

(58) Field of Classification Search
CPC ............... B41J 2/451; G02B 19/0061
(Continued)

(56) References Cited

U.S. PATENT DOCUMENTS

2005/0175043 A1* 8/2005 Kurose .............. G06K 15/1247
372/9
2007/0058180 A1* 3/2007 Inoue ...................... B41J 2/451
358/1.5

(Continued)

FOREIGN PATENT DOCUMENTS

| JP | 2006062161 A | 3/2006 |
| JP | 2006062162 A | 3/2006 |
| JP | 2006082451   | 3/2006 |

OTHER PUBLICATIONS

JPO Notice of Reasons for Rejection for corresponding JP Patent Application No. 2016-237450 dated Jun. 2, 2020.

*Primary Examiner* — Huan H Tran
*Assistant Examiner* — Alexander D Shenderov
(74) *Attorney, Agent, or Firm* — Cantor Colburn LLP

(57) ABSTRACT

A relative position detection method detecting a position of a light-emitting member relative to a lens array or a position of the lens array relative to the light-emitting member, in which the light-emitting member includes light-emitting elements arranged in a first direction and the lens array includes lenses arranged in the first direction and condenses light from the light-emitting elements to image positions of the light-emitting elements, optical axes of the lenses being orthogonal to the first direction. The method includes: causing the light-emitting elements to emit light; detecting, at a position displaced from the image positions along an optical axis direction, optical intensity distribution of light emitted from the light-emitting elements and transmitted through the lens array; and detecting a position of the light-emitting member relative to the lens array or a position of the lens array relative to the light-emitting member with use of the optical intensity distribution.

14 Claims, 11 Drawing Sheets

(58) Field of Classification Search
USPC ......................................................... 347/238
See application file for complete search history.

(56) References Cited

U.S. PATENT DOCUMENTS

| | | | |
|---|---|---|---|
| 2007/0166077 A1* | 7/2007 | Inoue | G03G 15/0115 |
| | | | 399/227 |
| 2009/0185828 A1* | 7/2009 | Koizumi | G02B 3/0056 |
| | | | 399/218 |
| 2012/0073120 A1* | 3/2012 | Shimazawa | G11B 5/105 |
| | | | 29/603.07 |

* cited by examiner

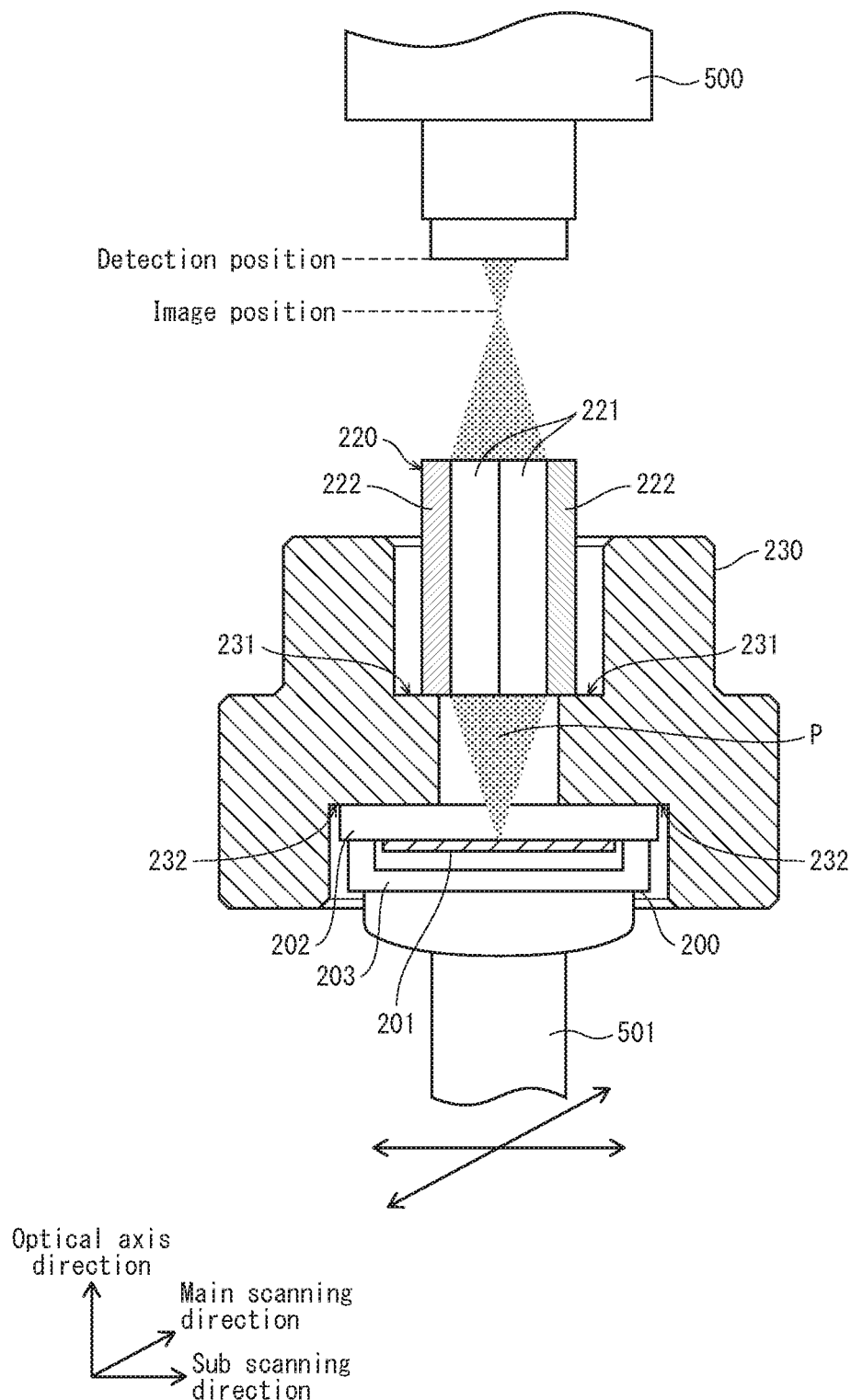

FIG. 6A
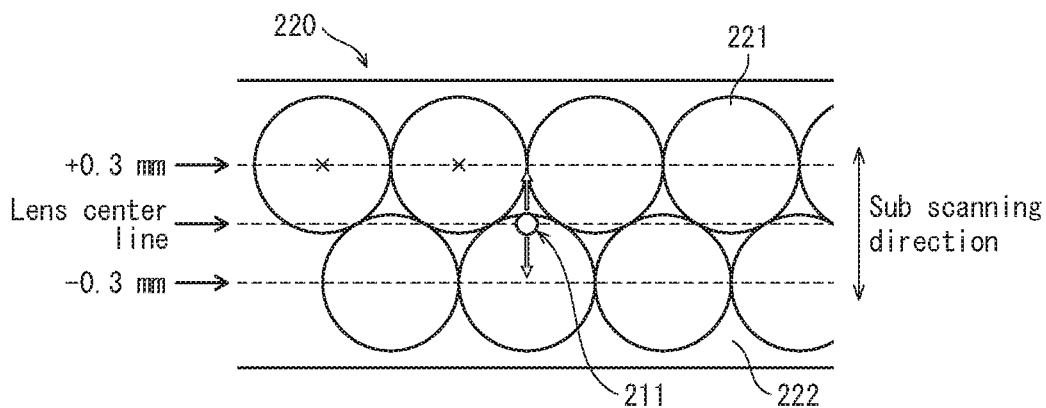
FIG. 6B
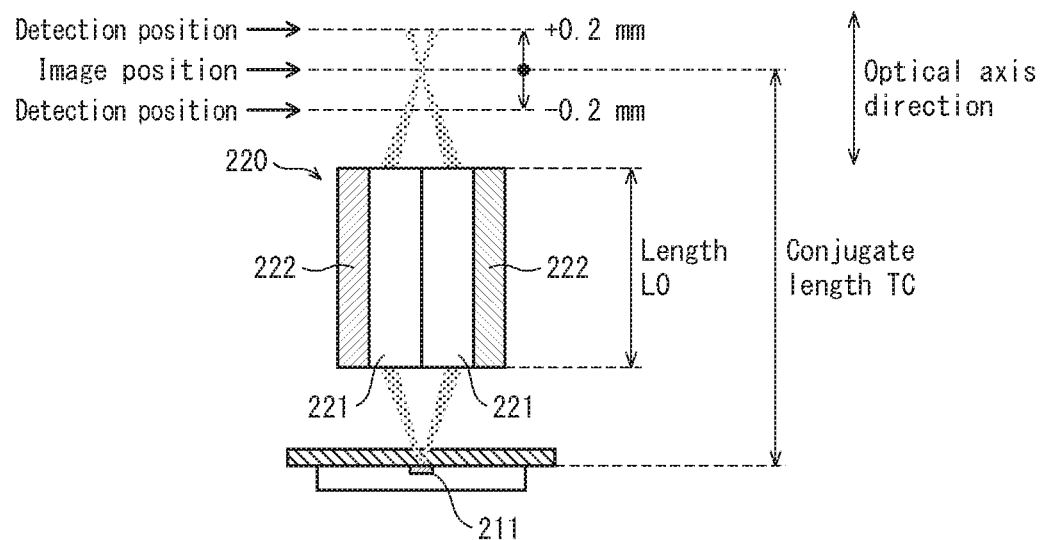
FIG. 6C
| | | Optical axis direction | | |
|---|---|---|---|---|
| | | −0.2 mm | Image position | +0.2 mm |
| Sub scanning direction | +0.3 mm | | | |
| | Center line | | | |
| | −0.3 mm | | | |

RELATIVE POSITION DETECTION METHOD, OPTICAL PRINT HEAD, AND IMAGE FORMING DEVICE

CROSS-REFERENCE TO RELATED APPLICATION(S)

This application is based upon and claims the benefit of priority from Japanese Patent Application No. 2016-237450, filed on Dec. 7, 2016, the entire contents of which are incorporated herein by reference.

BACKGROUND

Technical Field

The present invention relates to a relative position detection method, an optical print head, and an image forming device, and in particular to a technology for accurately detecting a position of a light-emitting element in an optical print head relative to a lens in the optical print head or a position of the lens relative to the light-emitting element.

Description of the Related Art

An electrophotographic image forming device includes an optical print head (PH; also referred to as an optical writing device) for causing a photoreceptor to be exposed to light to form an electrostatic latent image. For example, a light-scanning type optical print head using a laser diode (LD) as a light source deflects the LD light by using a rotary polygon mirror to scan the photoreceptor.

Meanwhile, a line optical type optical print head includes a light-emitting element substrate including light-emitting elements such as semiconductor light-emitting diodes (LEDs) or organic electroluminescence diodes (organic EL diodes; also referred to as organic LEDs (OLEDs)) that are arrayed in a main scanning direction as a single row or a plurality of rows in a staggered pattern. Such a line optical type optical print head causes the photoreceptor to be exposed to light through condensing light emitted from the light-emitting elements by using a rod lens array. Accordingly, line optical type optical print heads, unlike light-scanning type optical print heads, are advantageous in being free from mechanical operations, thus producing little noise, and having a short distance from the light-emitting elements to the photoreceptor, thus occupying little space.

In a line optical type optical print head, light amounts incident on a surface of the photoreceptor and shapes of light beam spots imaged on the surface of the photoreceptor may vary among the light-emitting elements when the light-emitting elements and the rod lens array are not arranged at appropriate positions relative to each other. When an image is formed with such light exposure unevenness occurring, the formed image may have defects such as density unevenness.

In order to solve such a problem, it is necessary to accurately detect a position of the light-emitting element substrate, on which the light-emitting elements are mounted, relative to the rod lens array or a position of the rod lens array relative to the light-emitting element substrate. In order to achieve this, for example, a method has been proposed of detecting a position in a sub scanning direction of the light-emitting element substrate relative to the rod lens array through placing an alignment mark on the light-emitting element substrate and observing the alignment mark on the light-emitting element substrate and an outer circumferential line of the rod lenses by using a charge-coupled device (CCD) camera (for example, see Japanese Patent Application Publication No. 2006-62161).

Further, a method has been proposed of detecting a position in a sub scanning direction of the light-emitting element substrate relative to the rod lens array through forming on the light-emitting element substrate, instead of an alignment mark, a circuit pattern that can be used as an alignment mark, and observing the circuit pattern and the outer circumferential line of the rod lenses by using a CCD camera (for example, see Japanese Patent Application Publication No. 2006-62162).

SUMMARY

However, a rod lens array is formed through collecting many columnar rod lenses and fixing the rod lenses through adhesion, and the rod lenses have varying diameters. Accordingly, in conventional technology in which the alignment mark on the light-emitting element substrate is matched to the outer circumferential line of the rod lenses, error in positions of the rod lens array and the light-emitting element substrate relative to each other may occur in accordance with variance of diameters of the rod lenses.

Further, because the rod lenses are arrayed along the main scanning direction, the method of matching the outer circumference of the rod lenses to an alignment mark or a circuit pattern extending in the main scanning direction can perform relative position detection only with respect to the sub scanning direction.

The present invention has been achieved in view of the above problems, and an aim thereof is to provide a relative position detection method, an optical print head, and an image forming device achieving detection of a position of the light-emitting element substrate relative to the rod lens array or a position of the rod lens array relative to the light-emitting element substrate, irrespective of variance of diameters of the rod lenses.

To achieve at least one of the abovementioned objects, a relative position detection method reflecting one aspect of the present invention is a relative position detection method detecting a position of a light-emitting member relative to a lens array or a position of the lens array relative to the light-emitting member, in which the light-emitting member includes a plurality of light-emitting elements arranged in a first direction and the lens array includes lenses arranged in the first direction and condenses light emitted from the light-emitting elements to image positions of the light-emitting elements, optical axes of the lenses being orthogonal to the first direction, the relative position detection method including: causing the light-emitting elements to emit light; performing light detection of detecting, at a position displaced from the image positions along an optical axis direction, optical intensity distribution of light emitted from the light-emitting elements and transmitted through the lens array; and performing position detection of detecting a position of the light-emitting member relative to the lens array or a position of the lens array relative to the light-emitting member with use of the detected optical intensity distribution.

BRIEF DESCRIPTION OF THE DRAWINGS

The advantages and features provided by one or more embodiments of the invention will become more fully understood from the detailed description given hereinbelow In the drawings:

FIG. 5 illustrates a device structure for detecting a position of the light-emitting element substrate 200 relative to a rod lens array 220;

FIG. 6A is a plan view illustrating positions in a sub scanning direction of a detection OLED 211 and the rod lens array 220 relative to each other, FIG. 6B is a cross-sectional view illustrating a detection position of a light detector 500, and FIG. 6C illustrates an example of optical intensity distribution detected for each different combination of a detection position of the light detector 500 and positions in a sub scanning direction of the detection OLED 211 and the rod lens array 220 relative to each other;

DETAILED DESCRIPTION

Hereinafter, one or more embodiments of the present invention will be described with reference to the drawings. However, the scope of the invention is not limited to the disclosed embodiments.

The following describes embodiments of a relative position detection method, an optical print head, and an image forming device pertaining to the present invention, with reference to the drawings.

[1] First Embodiment

The following describes a first embodiment of the present invention.

(1-1) Structure of Image Forming Device

The following describes a structure of an image forming device pertaining to the present embodiment.

Figure 1:
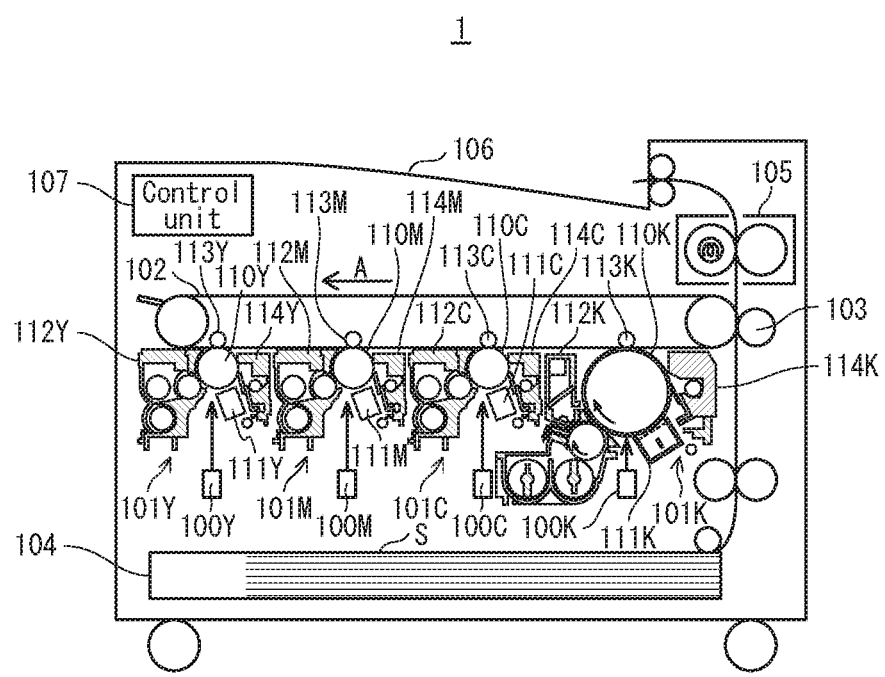
FIG. 1 illustrates main components of an image forming device pertaining to a first embodiment of the present invention.

As illustrated in FIG. 1, an image forming device 1 is a so-called tandem-type color printer device, and includes image forming units 101Y, 101M, 101C, and 101K forming images of colors yellow (Y), magenta (M), cyan (C), and black (K), respectively. The image forming unit 101Y includes an optical print head 100Y, a photoreceptor drum 110Y, an electricity charging device 111Y, a developing device 112Y, and a cleaning device 114Y. Similarly, the image forming unit 101M includes an optical print head 100M, a photoreceptor drum 110M, an electricity charging device 111M, a developing device 112M, and a cleaning device 114M; the image forming unit 101C includes an optical print head 100C, a photoreceptor drum 110C, an electricity charging device 111C, a developing device 112C, and a cleaning device 114C; and the image forming unit 101K includes an optical print head 100K, a photoreceptor drum 110K, an electricity charging device 111K, a developing device 112K, and a cleaning device 114K.

When forming a color image, the image forming units 101Y, 101M, 101C, and 101K respectively cause outer circumferential surfaces of the photoreceptor drums 110Y, 110M, 110C, and 110K to be uniformly charged by the electricity charging devices 111Y, 111M, 111C, and 111K. Then the image forming units 101Y, 101M, 101C, and 101K respectively cause the optical print heads 100Y, 100M, 100C, and 100K to each form an electrostatic latent image, and respectively cause the developing devices 112Y, 112M, 112C, and 112K to develop the electrostatic latent images.

Primary transfer rollers 113Y, 113M, 113C, and 113K electrostatically transfer the toner images of the colors Y, M, C, and K respectively carried on the outer circumferential surfaces of the photoreceptor drums 110Y, 110M, 110C, and 110K onto an intermediate transfer belt 102 in sequence, so that the toner images overlap each other. A color toner image is thus formed. Then, toner remaining on the outer circumferential surfaces of the photoreceptor drums 110Y, 110M, 110C, and 110K is removed by the cleaner devices 114Y, 114M, 114C, and 114K, respectively.

The intermediate transfer belt 102 is an endless belt, and rotates in a direction indicated by arrow A in order to convey the color toner image to a second transfer roller pair 103. In accordance with this, a recording sheet contained in a sheet feed tray 104 is picked up and conveyed to the secondary transfer roller pair 103. Then the color toner image on the intermediate transfer belt 102 is electrostatically transferred onto the recording sheet S. Then the color toner image on the recording sheet S is thermally fixed by a fixing device 105, and the recording sheet S is ejected onto a sheet ejection tray 106.

The image forming device 1 includes a control unit 107 controlling image forming operations as described above. Specifically, the control unit 107 includes an application specific integrated circuit (ASIC) and controls the optical print heads 100Y, 100M, 100C, and 100K.

Because the following description applies to all of the optical print heads 100Y, 100M, 100C, and 100K irrespective of their toner colors, the letters Y, M, C, and K in the reference signs are hereinafter omitted.

(1-2) Structure of Optical Print Head 100

The following describes a structure of the optical print head 100.

Figure 2:
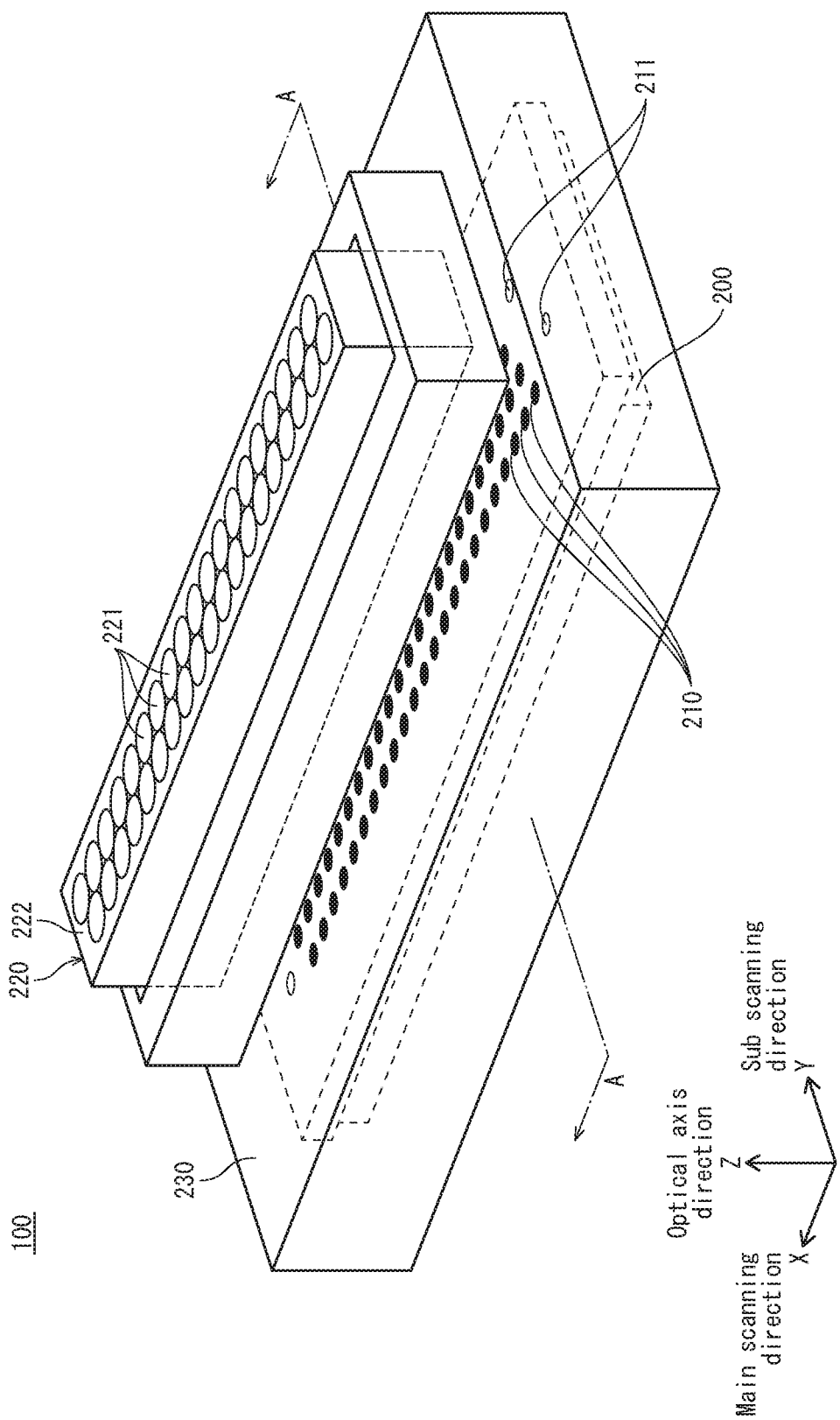
FIG. 2 is an external perspective view illustrating main components of an optical print head 100.
Figure 3:
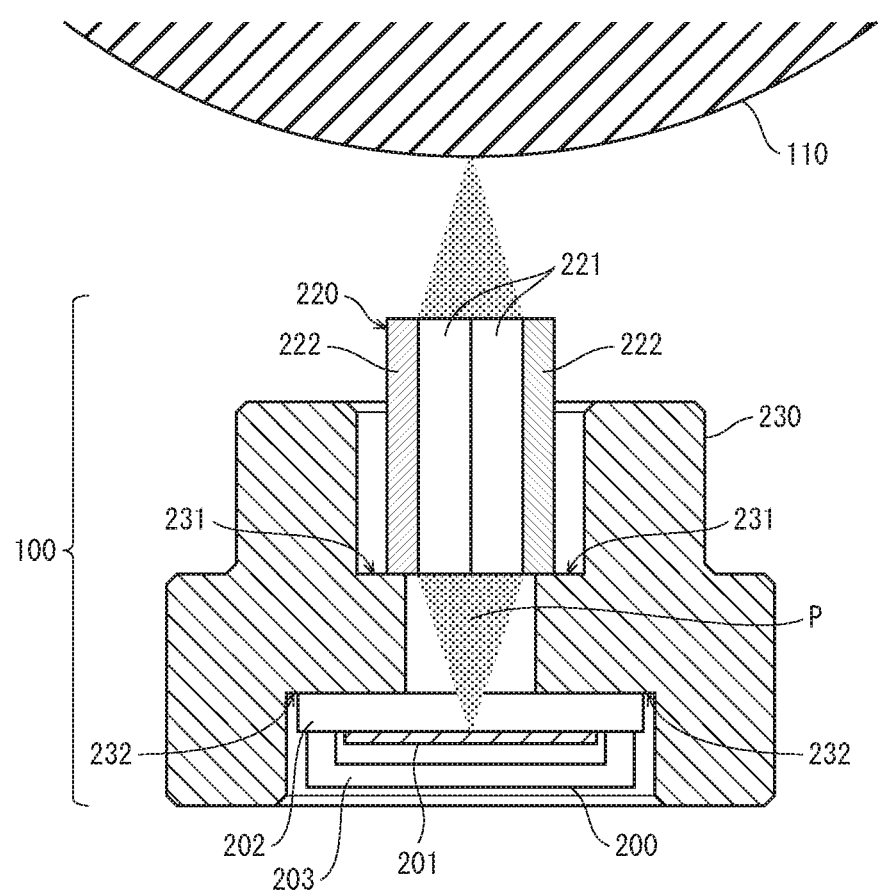
FIG. 3 is a cross-sectional view of the optical print head 100, taken along dot and dash line A-A in FIG. 2.

FIG. 2 is an external perspective view illustrating main components of an optical print head 100. In FIG. 2, a direction parallel to a rotational axis of the photoreceptor drum 110 is referred to as a main scanning direction (X direction) and a direction from the optical print head 100 to the photoreceptor drum 110 is referred to as an optical axis direction (Z direction). The optical axis direction corresponds to a direction of optical axes of rod lenses included in the optical print head 100. Further, a direction orthogonal to both the main scanning direction and the optical axis direction is referred to as a sub scanning direction (Y direction). FIG. 3 is a cross-sectional view of the optical print head 100, taken along dot and dash line A-A in FIG. 2.

The optical print head 100 includes a light-emitting element substrate 200, a rod lens array 220, and a holder 230. The light-emitting element substrate 200 is a circuit board elongated in the main scanning direction. The light-emitting element substrate 200 includes a glass substrate 202, a thin film transistor (TFT) circuit 201 disposed on the glass substrate 202, and a sealing member 203 sealing the TFT circuit 201.

On the TFT circuit 201, a plurality of (for example, 15,000) exposure organic light-emitting diodes (OLEDs) 210 used for optical writing are arrayed in the main scanning direction in a staggered pattern. FIG. 2 illustrates an example of a case in which three rows of the exposure OLEDs 210 are arranged in the main scanning direction in a staggered pattern, but the exposure OLEDs 210 may be arranged in two or less rows or four or more rows.

Further, on the light-emitting element substrate 200 are mounted detection OLEDs 211 for detecting a position of the light-emitting element substrate 200 relative to the rod lens array 220. The detection OLEDs 211 are arranged adjacent to ends in the main scanning direction of the exposure OLEDs 210, which are arrayed along the main scanning direction in a staggered pattern.

The rod lens array 220 is made of a plurality of rod lenses 221 arranged in two or more rows in the main scanning direction in a staggered pattern and fixed by resin 222. The rod lens array 220 causes light P emitted from the exposure OLEDs 210 to be imaged. In the present embodiment, each of the rod lenses 221 has an outer diameter of 0.56 mm, and each gap between centers of adjacent ones of the rod lenses 221 is 0.6 mm. For example, a SELFOC lens array (SLA; SELFOC is a registered trademark of Nippon Sheet Glass Co. Ltd.) may be used as the rod lens array 220.

In the image forming device 1, the photoreceptor drum 110 and the optical print head 100 are arranged so that light P emitted from the exposure OLEDs 210 is imaged on the outer circumferential surface of the photoreceptor drum 110.

The holder 230 holds the light-emitting element substrate 200 and the rod lens array 220. At a step portion 231 of the holder 230 is fixed the rod lens array 220, and at a step portion 232 of the holder 230 is fixed the light-emitting element substrate 200. This structure defines positions in the optical axis direction of the light-emitting element substrate 200 and the rod lens array 220 relative to each other.

Note that components such as cables that are necessary for connecting the optical print head 100 and other portions of the image forming device 1 are not illustrated in FIG. 2 and FIG. 3.

Figure 4:
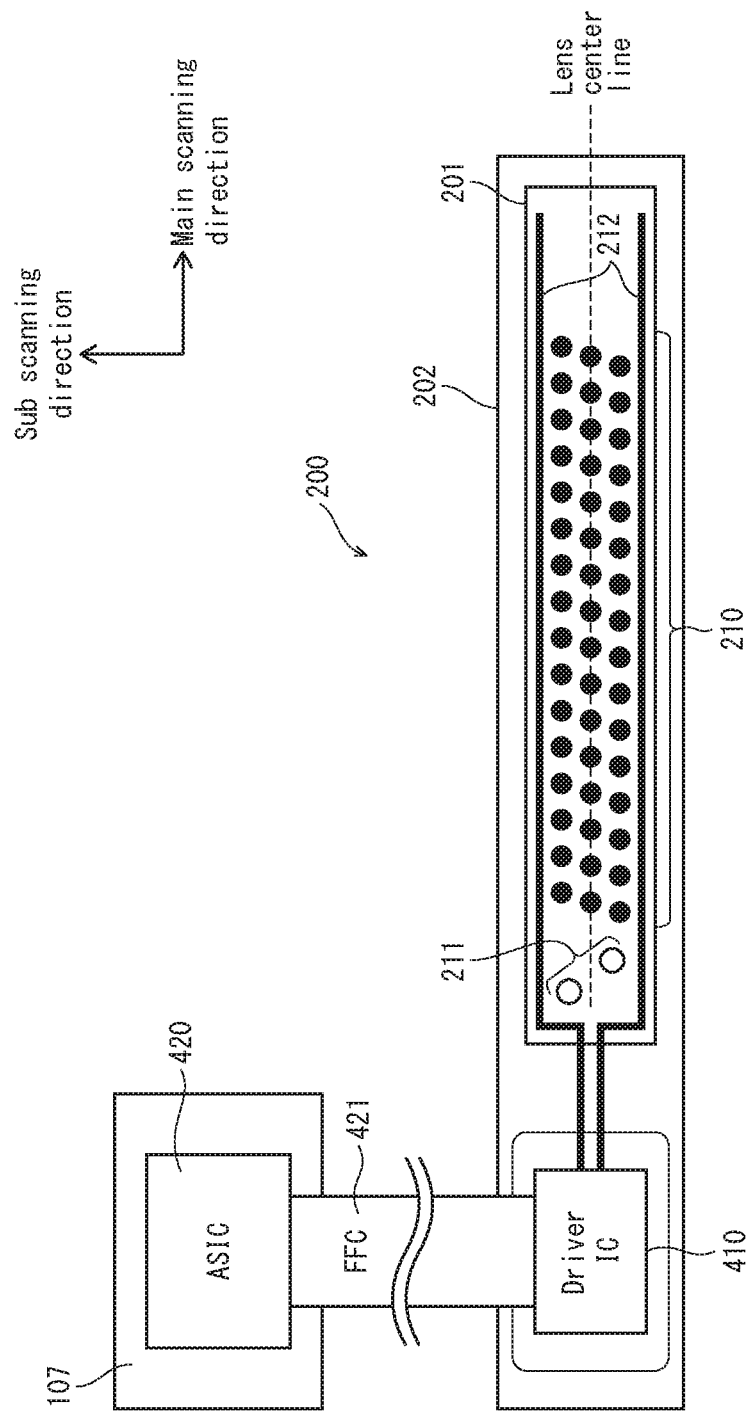
FIG. 4 is a plan view illustrating main components of a light-emitting element substrate 200.

FIG. 4 is a plan view illustrating main components of a light-emitting element substrate 200. As illustrated in FIG. 4, the TFT circuit 201 is disposed on the glass substrate 202 of the light-emitting element substrate 200. The TFT circuit 201 includes the exposure OLEDs 210 linearly arrayed in the main scanning direction, and light emitted from the exposure OLEDs 210 is emitted in the optical axis direction orthogonal to a main surface of the glass substrate 202.

The detection OLEDs 211 are arranged adjacent to the exposure OLEDs 210 in the sub scanning direction, and are used for detecting a position of the light-emitting element substrate 200 relative to the rod lens array 220. Note that light-emitting elements other than OLEDs may be used instead of the exposure OLEDs 210 and the detection OLEDs 211. Further, the exposure OLEDs 210 and the detection OLEDs 211 may differ from each other in sizes and shapes of light-emitting regions. Specific arrangement of the exposure OLEDs 210 and the detection OLEDs 211 is described later.

The TFT circuit 201 is disposed in a sealed region on the glass substrate 202. The sealed region is sealed by the sealing member 203. In a region on the glass substrate 202 outside the sealed region, a driver integrated circuit (IC) 410 is mounted. The driver IC 410 connects to the ASIC 420 of the control unit 107 of the image forming device 1 through a wire such as a flexible flat cable (FFC) 421 and receives image data or the like.

The driver IC 410 connects to the TFT circuit 201 through a wire 212, and performs operations such as control of switching on and switching off of the exposure OLEDs 210 and the detection OLEDs 211 and adjustment of light amounts emitted from the exposure OLEDs 210 and the detection OLEDs 211.

(1-3) Device Structure for Detecting Relative Position

The following describes a device structure for detecting a position of the light-emitting element substrate 200 relative to the rod lens array 220.

FIG. 5 illustrates a device structure for detecting a position of the light-emitting element substrate 200 relative to the rod lens array 220. As illustrated in FIG. 5, a light detector 500 is used for detecting a position of the light-emitting element substrate 200 relative to the rod lens array 220. In the present embodiment, a charge-coupled device (CCD) camera is used as the light detector 500.

Light P emitted from a detection OLED 211 is focused by the rod lenses 221 at an image position along the optical axis direction of the rod lenses 221. A position other than the image position along the optical axis direction at which the light P emitted from the detection OLEDs 211 is focused is used as a detection position for detecting optical intensity distribution of the light P. This optical intensity distribution is a two-dimensional distribution of intensity of the light P at the detection position.

Optical intensity distribution detected by the light detector 500 varies in accordance with positions of the light-emitting element substrate 200 and the rod lens array 220 relative to each other.

When detecting a position of the light-emitting element substrate 200 relative to the rod lens array 220 with use of the detection OLED 211, the holder 230 is held by a jig (not illustrated) with the rod lens array 220 fixed at the step portion 231. The light detector 500 is also held by the jig. This structure defines a distance from the image position to the detection position of the light detector 500 (hereinafter referred to as "defocusing distance").

In the following, the defocusing distance is indicated as a positive number when a distance from the rod lens array 220 to the detection position of the light detector 500 is longer than a distance from the rod lens array 220 to the image position, while the defocusing distance is indicated as a negative number when the distance from the rod lens array 220 to the detection position of the light detector 500 is shorter than the distance from the rod lens array 220 to the image position.

The light-emitting element substrate 200 is held by a movable suction holding jig 501. The suction holding jig 501 can move the light-emitting element substrate 200 in the main scanning direction and in the sub scanning direction simultaneously with the light-emitting element substrate 200 held by the suction holding jig 501. Optical intensity distribution detected by the light detector 500 changes in accordance with movement of the light-emitting element substrate 200 because positions of the detection OLEDs 211 relative to the rod lens array 220 change in accordance with movement of the light-emitting element substrate 200.

Positions of the detection OLED 211 and the exposure OLEDs 210 relative to each other are fixed on the light-emitting element substrate 200. Accordingly, positions of the exposure OLEDs 210 relative to the rod lens array 220 are obtained through obtaining a position of the detection OLED 211 relative to the rod lens array 220 through detection of optical intensity distribution with use of the light detector 500.

Accordingly, the light-emitting element substrate 200 and the rod lens array 220 are accurately positioned through: (i) referring to optical intensity distribution of light emitted from the detection OLED 211 and detected by using the light detector 500 while operating the suction holding jig 501 to move the light-emitting element substrate 200 with the holder 230 and the light detector 500 held by the jig, which is not illustrated, and with the light-emitting element substrate 200 held by the suction holding jig 501; and (ii) when the exposure OLEDs 210 reach desired positions relative to the rod lens array 220, terminating operations of the suction holding jig 501 and fixing the light-emitting element substrate 200 to the holder 230 through adhesion.

(1-4) Relationship Between Relative Position and Optical Intensity Distribution

The following describes a relationship between positions of the detection OLED 211 and the rod lens array 220 relative to each other and optical intensity distribution of the light P. Optical intensity distribution detected by the light detector 500 is affected by a detection position in the optical axis direction of the light detector 500. Accordingly, description is given in the following through providing an example of optical intensity distribution for each different combination of displacement of the detection OLED 211 and displacement of the light detector 500.

(1-4-1) Relationship Between Displacement in Sub Scanning Direction of Detection OLED 211 and Optical Intensity Distribution The following describes optical intensity distribution detected by the light detector 500 when the detection OLED 211 is displaced in the sub scanning direction relative to the rod lens array.

Figures 7A, 7B:
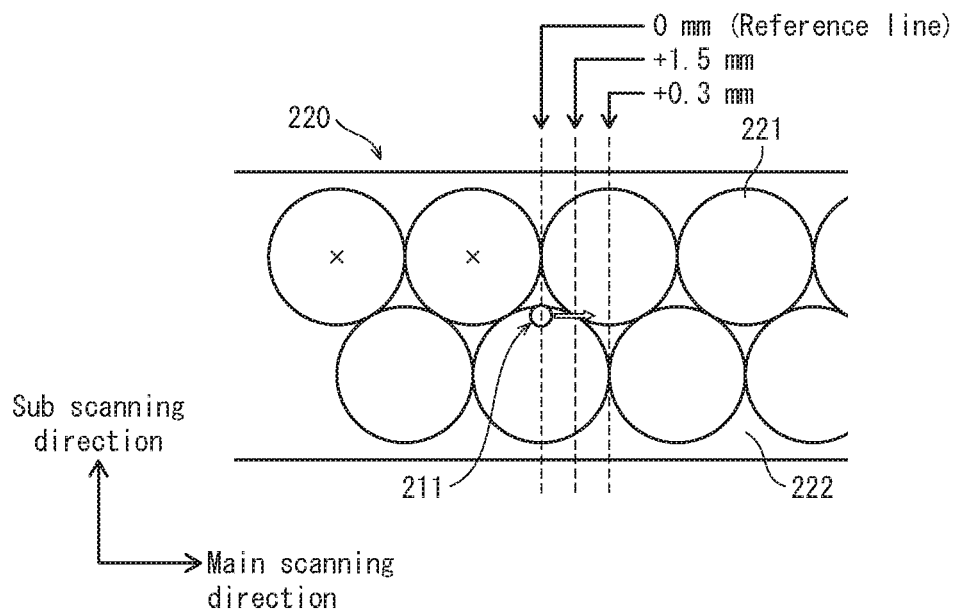
FIG. 7A is a plan view illustrating positions in a main scanning direction of the detection OLED 211 and the rod lens array 220 relative to each other.
FIG. 7B illustrates an example of optical intensity distribution detected for each different combination of a detection position of the light detector 500 and positions in the main scanning direction of the detection OLED 211 and the rod lens array 220 relative to each other.

In the following, a straight line that extends in the main scanning direction and that passes through a center position in the sub scanning direction of two rows of rod lenses 221 extending in the main scanning direction in a staggered pattern is referred to as "lens center line" (FIG. 6A). Further, a straight line that extends in the sub scanning direction and that passes through a center of a rod lens 221 belonging to one of the two rows of the rod lenses 221, which are arrayed in the main scanning direction in a staggered pattern, is hereinafter referred to as "reference line" (FIG. 7A).

FIG. 6C illustrates examples of optical intensity distribution detected by the light detector 500 when the detection OLED 211 is displaced in the sub scanning direction along the reference line by a distance of ±0.3 mm from an intersection of the lens center line and the reference line and when the detection position of the light detector 500 is displaced in the optical axis direction by a distance of ±0.2 mm from the image position of the light P emitted from the detection OLED 211 (FIG. 6B).

As illustrated in FIG. 6C, when the detection position of the light detector 500 is at the image position, optical intensity distribution detected by the light detector 500 shows a similar pattern regardless of whether the detection OLED 211 is on the lens center line of the rod lens array 220 or is displaced in the sub scanning direction from the lens center line.

Meanwhile, when the defocusing distance is ±0.2 mm, light emitted from the detection OLED 211 enters the light detector 500 at different positions depending on which one of the rod lenses 221 the light emitted from the detection OLED 211 is transmitted through. Accordingly, optical intensity distribution in which the light P transmitted through and divided between different ones of the rod lenses 221 is detected.

Optical intensity distribution detected when the detection position is not at the image position varies in accordance with the detection position and positions of the lens center line of the rod lens array 220 and the detection OLED 211 relative to each other. Accordingly, positions in the sub scanning direction can be accurately adjusted through operating the suction holding jig 501 while checking optical intensity distribution detected by the light detector 500, so that optical intensity distribution is detected when the detection OLED 211 is on the lens center line of the rod lens array 220.

Such operations can be performed both when the defocusing distance is +0.2 mm and when the defocusing distance is −0.2 mm. Accordingly, optical intensity distribution detected when the defocusing distance is +0.2 mm and optical intensity distribution detected when the defocusing distance is −0.2 mm is compared in order to determine which defocusing distance is preferable for adjustment of the position of the detection OLED 211.

The rod lens array 220 has a characteristic such that, for each of the rod lenses 221 in the rod lens array 220, the greater a distance between the detection OLED 211 and a center of the rod lens 221 is in plan view from the optical axis direction, the lower imaging efficiency of the rod lens 221 is. Further, the closer the detection OLED 211 is to the center of a rod lens 221, the more distant an image position of the rod lens 221 is in the optical axis direction from the rod lens 221; also, the more distant the detection OLED 211 is from the center of a rod lens 221, the closer the image position of the rod lens 221 is to the rod lens 221.

Accordingly, greater optical intensity is detected when optical intensity distribution of the light P emitted from the detection OLED 211 is detected at a position at which the defocusing distance has a positive number, e.g. a position at which the defocusing distance is +0.2 mm, than when optical intensity distribution of the light P emitted from the detection OLED 211 is detected at a position at which the defocusing distance has a negative number, e.g. a position at which the defocusing distance is −0.2 mm.

Because the most intense and the most vivid detection result is observed for intensity of light that is transmitted through the rod lens 221 closest to the detection OLED 211 in plan view from the optical axis direction, changes in a position of the detection OLED 211 relative to the rod lens array 220 is accurately detected.

The above description clarifies that the light P that is transmitted through and divided between the rod lenses 221 is detected when the detection position of the light detector 500 is displaced from the image position by ±0.2 mm, taking a case in which each of the rod lenses 221 has an outer diameter of 0.56 mm and each gap between centers of adjacent ones of the rod lenses 221 is 0.6 mm as an example.

Typically, when:
a length in the optical axis direction of a rod lens 221 is L0 mm,
a conjugate length of the rod lens 221 is TC mm,
an outer diameter of a light-emitting region of the detection OLED 211 is R mm, and
the shortest distance from a center of the rod lens 221 in plan view from the optical axis direction to a center of the light-emitting region of the detection OLED 211 is W mm, light that is transmitted through and divided between the rod lenses 221 can be recognized in optical intensity distribution detected by using the light detector 500 if the defocusing distance is:

$$\{(TC-L0)/2\} \times (R/2)/W \qquad (1)$$

or greater. Note that the conjugate length TC of a rod lens 221 is a distance in the optical axis direction from the detection OLED 211 to the image position.

(1-4-2) Relationship Between Displacement in Main Scanning Direction of Detection OLED 211 and Optical Intensity Distribution The following describes optical intensity distribution detected by the light detector 500 when the detection OLED 211 is displaced in the main scanning direction relative to the rod lens array.

FIG. 7B illustrates examples of optical intensity distribution detected by the light detector 500 when the detection OLED 211 is displaced in the main scanning direction along the reference line by a distance of 0.15 mm from the intersection of the lens center line and the reference line and the detection position of the light detector 500 is displaced in the optical axis direction from the image position of the light P emitted from the detection OLED 211 by a distance of ±0.2 mm.

When the detection OLED 211 is at the intersection of the lens center line and the reference line, the position of the detection OLED 211 in the main scanning direction matches the position in the main scanning direction of the center of a first rod lens 221 belonging to one of two rows of the rod lenses 221. When the detection OLED 211 is displaced in the main scanning direction from the above-described position by a distance of 0.3 mm, the position in the main scanning direction of the detection OLED 211 matches the position in the main scanning direction of the center of a second rod lens 221 belonging to the other of the two rows of the rod lenses 221. When the detection OLED 211 is displaced in the main scanning direction by a distance of 0.15 mm, the position of the detection OLED 211 is at an equal distance in the main scanning direction from the position in the main scanning direction of the center of the first rod lens 221 and the position in the main scanning direction of the center of the second rod lens 221.

As illustrated in FIG. 7B, when the defocusing distance is −0.2 mm, changes in a position in the main scanning direction of the detection OLED 211 relative to the rod lens array 220 are accurately detected through observing intensity distribution of the light transmitted through and divided between the rod lenses 221 adjacent to the detection OLED 211 in plan view from the optical axis direction.

As described above, a position of the light-emitting element substrate 200 relative to the rod lens array 220 is accurately detected in both the main scanning direction and the sub scanning direction through detecting light intensity distribution at a defocusing position (detection position).

Further, unlike conventional technology in which the outer circumference of the rod lenses 221 is matched to an alignment mark or a circuit pattern, it is unnecessary to refer to a position at an outer circumference of the rod lenses 221 in order to detect a position of the light-emitting element substrate 200 relative to the rod lens array 220 in the present embodiment. Accordingly, a position of the light-emitting element substrate 200 relative to the rod lens array 220 is detected even when the rod lenses 221 have varying diameters.

(1-5) Relative Position Detection Method

The relative position detection method pertaining to the present embodiment is summarized as in the following.

(a) The detection OLED 211 is turned on, and the light emitted from the detection OLED 211 is condensed by the rod lens array 220;

(b) intensity distribution of the light that is transmitted through the rod lens array 220 is detected by using the light detector 500; and (c) a position of the light-emitting element substrate 200 relative to the rod lens array 220 is detected from the detected optical intensity distribution.

Here, the light detector 500 detects optical intensity distribution at a position differing from the image position, at which the emitted light is focused by the rod lens 221, along an optical axis direction of the rod lens 221. Further, a position of the light-emitting element substrate 200 relative to the rod lens array 220 may be detected through comparing the detected optical intensity distribution data with optical intensity distribution data that has been prepared in advance. Further, a position of the light-emitting element substrate 200 relative to the rod lens array 220 may be detected through extracting a characteristic amount, such as a peak position of optical intensity, from the detected optical intensity distribution and comparing the extracted characteristic amount with a characteristic amount that has been prepared in advance.

Because a displacement amount from the desired position of the light-emitting element substrate 200 relative to the rod lens array 220 is obtained through relative position detection, the light-emitting element substrate 200 and the rod lens array 220 can be moved toward the desired position of the light-emitting element substrate 200 relative to the rod lens array 220 through moving the light-emitting element substrate 200 in a direction such that displacement can be compensated for.

[2] Second Embodiment

The following describes a second embodiment of the present invention.

An image forming device pertaining to the present embodiment, while having a structure similar to the structure of the image forming device pertaining to the first embodiment described above, is characterized in that the light-emitting element substrate 200 is positioned relative to the rod lens array 220 through positioning the detection OLED 211 at a center position surrounded by three adjacent rod lenses 221 in plan view from the optical axis direction. In the following, description is given focusing on characteristics of the present embodiment. Note that the same reference signs are annexed to members included in more than one embodiment in this description.

(2-1) Single Detection OLED 211

The following describes a case of a structure with a single detection OLED 211.

Figure 8A:
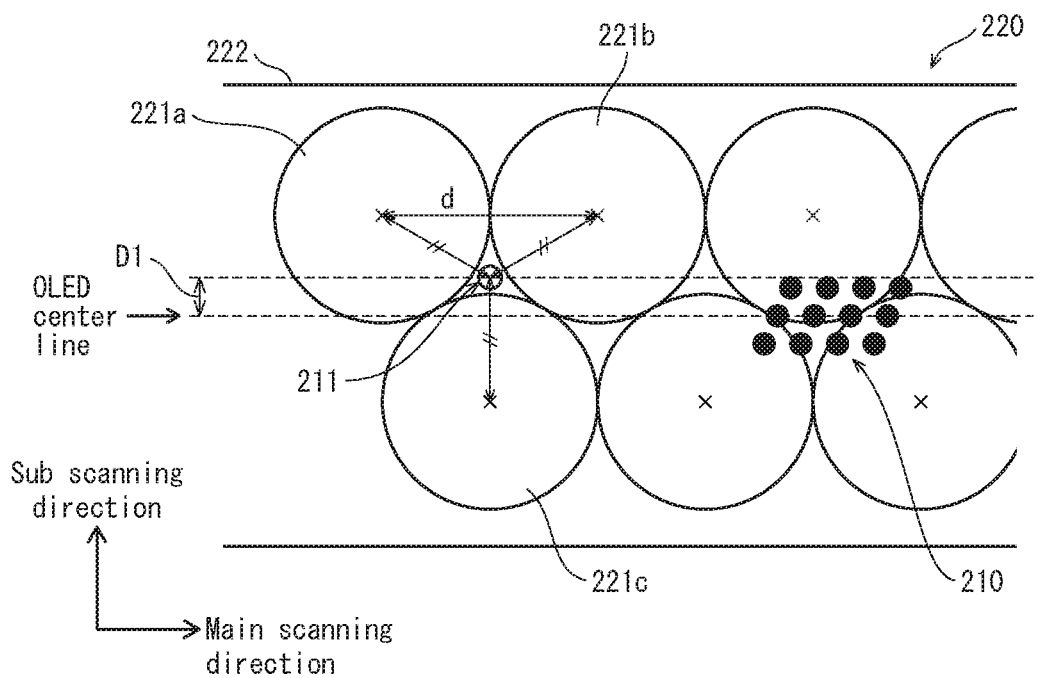
FIG. 8A is a plan view illustrating positions in the main scanning direction of exposure OLEDs 210, the detection OLED 211, and the rod lens array 220 relative to one another.

FIG. 8A illustrates positions of the exposure OLEDs 210, the detection OLED 211, and the rod lenses 221 relative to each other, after positioning is completed. As illustrated in FIG. 8A, a straight line that passes through a center position in the sub scanning direction of three rows of exposure OLEDs 210 arrayed in the main scanning direction in a staggered pattern and that extends in the main scanning direction (hereinafter referred to as "OLED center line") matches the lens center line in plan view. The OLED center line passes through centers of exposure OLEDs 210 belonging to a row at a center in the sub scanning direction among the three rows of the exposure OLEDs 210.

Meanwhile, a center of the detection OLED 211 is arranged at a position at an equal distance from centers of three rod lenses 221a, 221b, and 221c surrounding the detection OLED 211 in plan view. The center of the detection OLED 211 is on a reference line that extends in the sub scanning direction and that passes through a center of the rod lens 221c, which is a rod lens other than two rod lenses 221a and 221b that are adjacent to each other in the main scanning direction among the three rod lenses 221a, 221b, and 221c.

When referring to a gap between centers of adjacent rod lenses 221 as d mm, distance D1 from the center of the detection OLED 211 to the OLED center line is:

$$D1=(d/2)/\cos 30°-(d/2)\times\cos 30° \text{ mm} \quad (2)$$

That is, at the TFT circuit 201 pertaining to the present embodiment, the exposure OLEDs 210 and the detection OLED 211 are arranged so that the center of the detection OLED 211 is at a position spaced away in the sub scanning direction by distance D1 from a straight line connecting centers of the exposure OLEDs 210 belonging to the row at the center among the three rows of the exposure OLEDs 210.

Because the exposure OLEDs 210 and the detection OLED 211 are formed through a semiconductor producing process for forming the TFT circuit 201, the exposure OLEDs 210 and the detection OLED 211 are accurately arranged at desired positions relative to each other. Accordingly, the detection OLED 211 can be accurately arranged at a position spaced away from the OLED center line by a desired distance.

Due to this structure, the exposure OLEDs 210 can be accurately positioned relative to the rod lens array 220 through operating the suction holding jig 501 so that the center of the detection OLED 211 is at the center of the three adjacent rod lenses 221a, 221b, and 221c to position the light-emitting element substrate 200 and the holder 230.

Figure 8B:
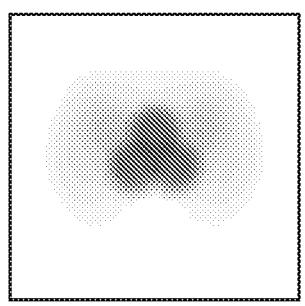
FIG. 8B illustrates an example of optical intensity distribution detected in a case in which the detection OLED 211 is at a position in plan view at an equal distance from centers of three adjacent rod lenses 221.

Further, as exemplified in FIG. 8B, when the detection position of the light detector 500 is set so that the defocusing distance has a positive number and the light P that is transmitted through and divided between the rod lenses 221a, 221b, and 221c, optical intensity distribution in which the light that is transmitted through and divided between the three adjacent rod lenses 221a, 221b, and 221c has satisfactory intensity. A position of the detection OLED 211 relative to the rod lens array 220 is thus accurately detected.

Further, through operating the suction holding jig 501 so that the light P that is transmitted through and divided between the three rod lenses 221a, 221b, and 221c in equal light amounts, the light-emitting element substrate 200 and the rod lens array 220 can be accurately adjusted so that the light-emitting element substrate 200 is arranged at the desired position relative to the rod lens array 220 in both the main scanning direction and the sub scanning direction.

(2-2) Two Detection OLEDs 212

The following describes a case of a structure with two detection OLEDs 212. In this case, the two detection OLEDs 211 may have positions relative to each other such as one of the following: (i) the two detection OLEDs 211 are at different sides in the sub scanning direction relative to the OLED center line; and (ii) the two detection OLEDs 211 are at the same side in the sub scanning direction relative to the OLED center line. Note that the defocusing distance has a positive number in both of the above cases.

(2-2-1) When Arranged at Different Sides Relative to OLED Center Line

The following describes a case in which the two detection OLEDs 211a and 211b are arranged at different sides relative to the OLED center line.

Figure 9A:
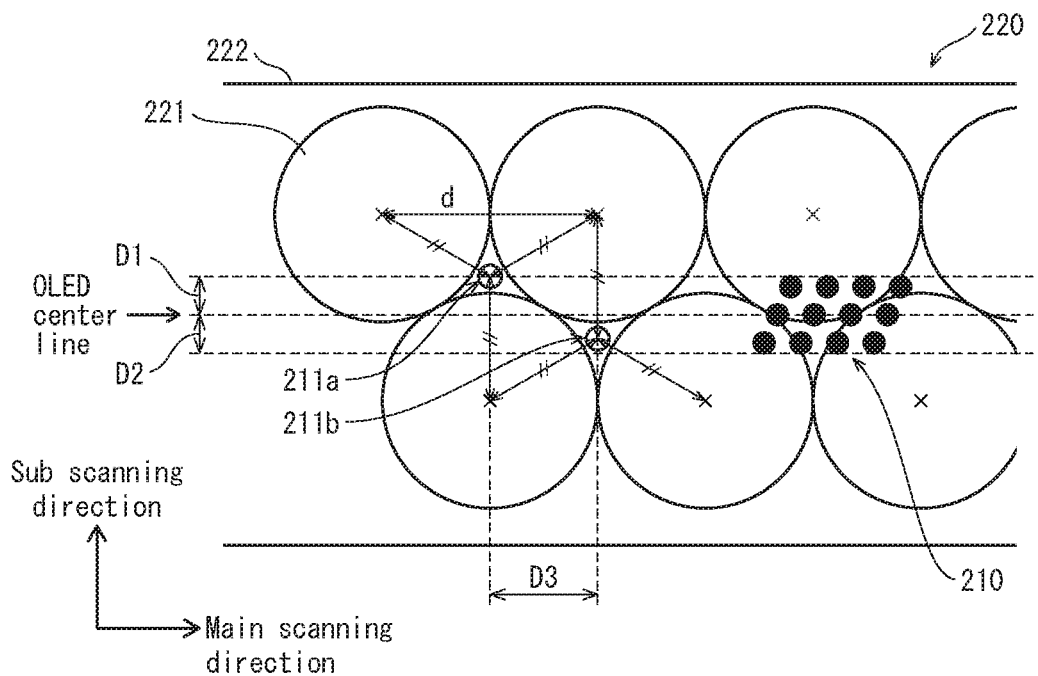
FIG. 9A is a plan view illustrating an example of a case in which two detection OLEDs 211a and 211b are at different sides relative to an OLED center line.

As illustrated in FIG. 9A, when the two detection OLEDs 211a and 211b are arranged at different sides in the sub scanning direction relative to the OLED center line, distance D1 from the OLED center line to the detection OLED 211a is indicated by equation (2), and distance D2 from the OLED center line to the detection OLED 211b is indicated by:

$$D2=(d/2)/\cos 30°-(d/2)\times\cos 30° \text{ mm} \quad (3)$$

Further, in FIG. 9A, distance D3 in the main scanning direction between the detection OLEDs 211a and 211b is (d/2). However, the present invention is not limited to this, and any distance D3 that satisfies:

$$D3=N\times d+(d/2) \text{ mm}(N=\text{an integer equal to or greater than 0}) \quad (4)$$

is acceptable.

As described above, a position of the light-emitting element substrate 200 relative to the rod lens array 220 is accurately adjusted through arranging two detection OLEDs 211a and 211b and operating the suction holding jig 501 so that light P emitted from the detection OLEDs 211a and 211b and transmitted through the three rod lenses 221 has an equal optical intensity distribution.

Further, when only one detection OLED 211 is included, it is not always easy to accurately detect displacement relative to each other of the light-emitting element substrate 200 and the rod lens array 220 (hereinafter referred to as relative position displacement) in a rotational direction about the detection OLED 211.

Meanwhile, when two detection OLEDs 211a and 211b are included, and relative position displacement in a rotational direction about one detection OLED 211a occurs, relative position displacement in the main scanning direction and the sub scanning direction occurs with respect to the other detection OLED 211b. Because relative position displacement in the main scanning direction and the sub scanning direction with respect to the other detection OLED 211b can be accurately corrected through detecting intensity distribution of light emitted from the other detection OLED 211b, relative position displacement in the rotational direction about the one detection OLED 211a can be accurately corrected.

With use of the detection OLEDs 211a and 211b, the greater the distance D3 in the main scanning direction between the two detection OLEDs 211a and 211b is, the more accurately the detection of relative position displacement in the rotational direction can be performed. This is because the greater the distance D3, the greater relative position displacement in the main scanning direction and the sub scanning direction of one of the two OLEDs caused by relative position displacement in the rotational direction about the other of the two OLEDs.

(2-2-2) When Arranged at Same Side Relative to OLED Center Line

The following describes a case in which the two detection OLEDs 211a and 211b are arranged at the same side relative to the OLED center line.

Figure 9B:
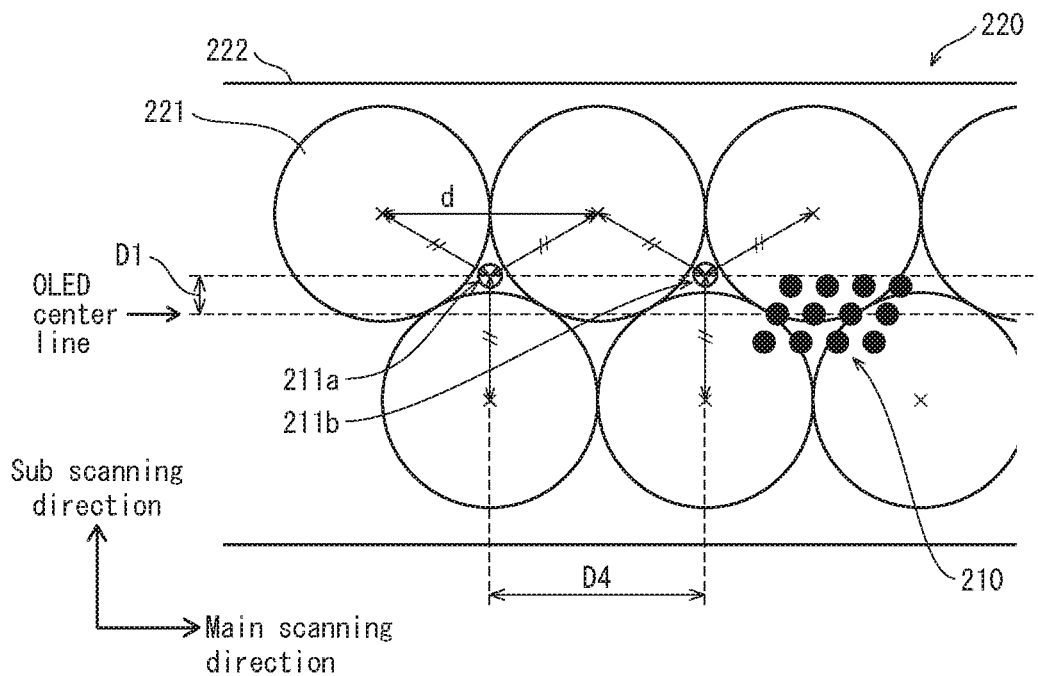
FIG. 9B is a plan view illustrating an example of a case in which two detection OLEDs 211a and 211b are at the same side relative to the OLED center line.

As illustrated in FIG. 9B, when the two detection OLEDs 211a and 211b are arranged at the same side in the sub scanning direction relative to the OLED center line, a distance from the OLED center line to the detection OLED 211a and a distance from the OLED center line to the detection OLED 211b are both distance D1 calculated by equation (2). In 9B, distance D4 in the main scanning direction between the detection OLEDs 211a and 211b is d. However, the present invention is not limited to this, and any distance D4 satisfying:

$$D4 = N \times d \text{ mm}(N = \text{an integer equal to or greater than } 0) \qquad (5)$$

is acceptable. Further, three or more detection OLEDs 211 may be included.

As described above, a position of the light-emitting element substrate 200 relative to the rod lens array 220 can be accurately adjusted through arranging a plurality of detection OLEDs 211 and operating the suction holding jig 501 so that light P transmitted through and divided between the three rod lenses 221 in an equal optical intensity distribution.

Further, relative position displacement in the rotational direction about the detection OLED 211a and in the rotational direction about the detection OLED 211b can be accurately corrected in a manner similar to a case in which two detection OLEDs 211a and 211b are arranged at different sides relative to the OLED center line.

[3] Third Embodiment

The following describes a third embodiment of the present invention.

The present embodiment does not include a detection OLED 211 separately from the exposure OLEDs 210; in the present embodiment, an exposure OLED 210 functions also as a detection OLED 211.

Figure 10:
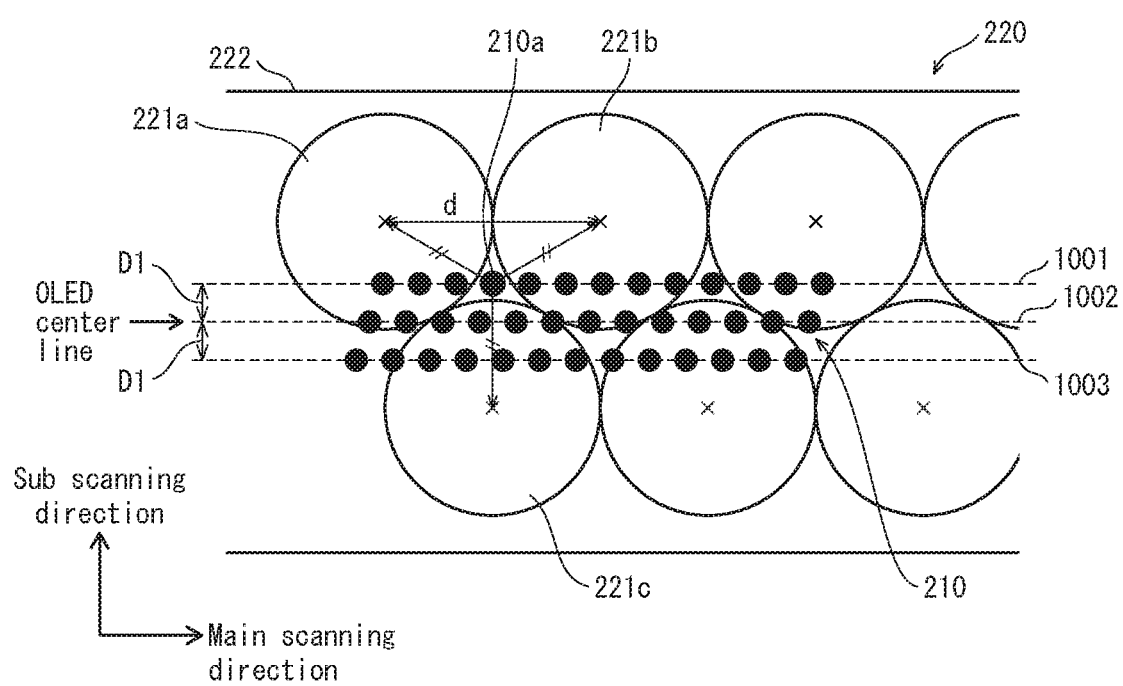
FIG. 10 is a plan view illustrating a case in which one of the exposure OLEDs 210 also functions as the detection OLED 211.

As illustrated in FIG. 10, straight lines 1001, 1002, and 1003 respectively passing through centers of three lines of the exposure OLEDs 210 that extend in the main scanning direction in a staggered pattern are arrayed in the sub scanning direction at an equal distance of D1. Among the straight lines 1001, 1002, and 1003, the straight line 1002 is the OLED center line. As described above, distance D1 is calculated from distance d mm between centers of adjacent ones of the rod lenses 221 by using formula (1).

In the present embodiment, description is provided taking a case in which an exposure OLED 210a that is one of the exposure OLEDs 210 on the straight line 1001 functions also as a detection OLED 211 as an example. However, instead of this structure, an exposure OLED 210 on the straight line 1003 may function also as a detection OLED 211.

When positioning the light-emitting element substrate 200 and the rod lens array 220, the detection position of the light detector 500 is set so that the defocusing distance has a positive number, and the suction holding jig 501 is operated so that, in a state in which light P emitted from the exposure OLED 210a and transmitted through and divided between rod lenses 221a, 221b, and 221c, detected optical intensity distribution is such that the light that is transmitted through the three adjacent rod lenses 221a, 221b, and 221c has similar optical intensity at the three adjacent rod lenses 221a, 221b, and 221c.

This structure achieves accurate adjustment of a position of the light-emitting element substrate 200 relative to the rod lens array 220. Further, in a manner similar to the second embodiment described above, a position of the light-emitting element substrate 200 relative to the rod lens array 220 is also accurately detected and adjusted in the rotational direction when a plurality of exposure OLEDs 210 function also as detection OLEDs 211.

Further, because the detection OLEDs 211 do not have to be provided separately from the exposure OLEDs 210, a size of the TFT circuit 201, and thus a size of the light-emitting element substrate 200, can be small.

[4] Fourth Embodiment

The following describes a fourth embodiment of the present invention.

While the first, the second, and the third embodiments described above aim to accurately detect a position of the light-emitting element substrate 200 relative to the rod lens array 220 when assembling the optical print head 100, the present embodiment aims to detect displacement of positions of the light-emitting element substrate 200 and the rod lens array 220 caused by thermal expansion or the like.

Figure 11:
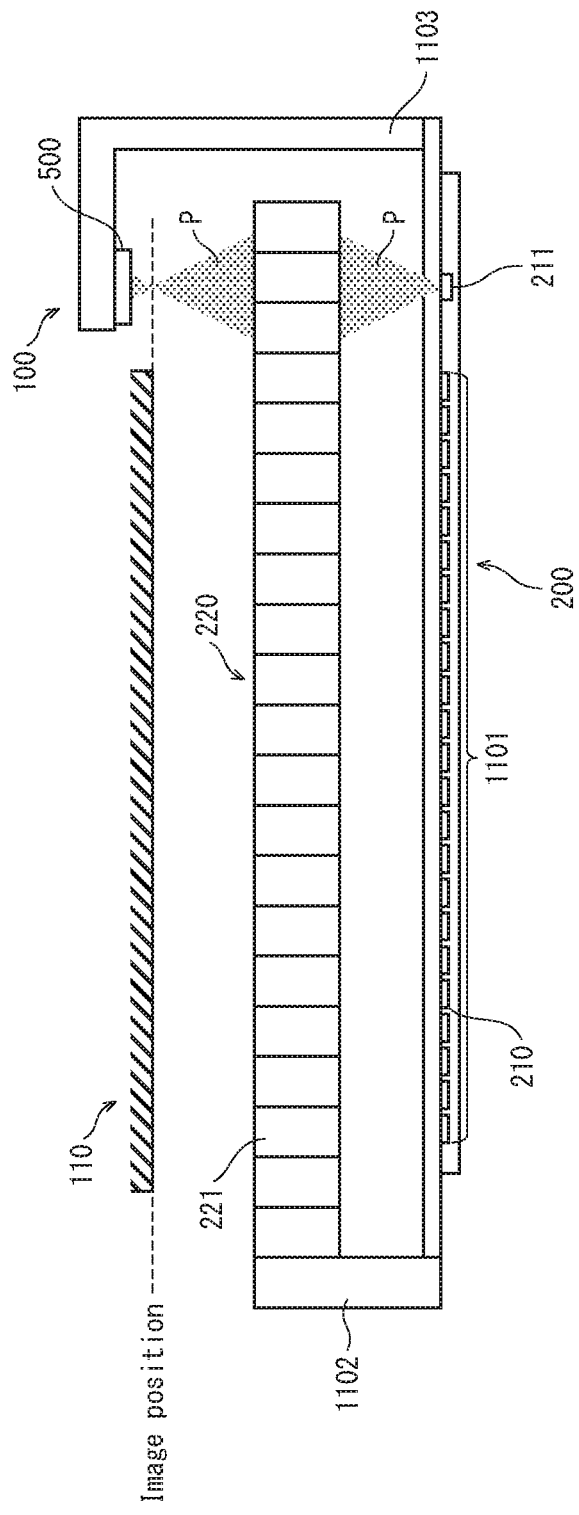
FIG. 11 illustrates main components of an optical print head 100 pertaining to a fourth embodiment.

As illustrated in FIG. 11, the optical print head 100 pertaining to the present embodiment is assembled so that the outer circumferential surface of the photoreceptor drum 110 is at the image position of the rod lens array 220. Due to such an arrangement, the rod lens array 220 condenses light emitted from the exposure OLEDs 210 onto the outer circumferential surface of the photoreceptor drum 110.

The light-emitting element substrate 200 and the rod lens array 220 are connected to a supporting member 1102 through ends in the main scanning direction (hereinafter referred to as "fixed ends") alone. The other ends in the main scanning direction (hereinafter referred to as "free ends") of the light-emitting element substrate 200 and the rod lens array 220 are not fixed to each other.

Further, the light-emitting element substrate 200 and the rod lens array 220 are made of materials differing from each other. When, for example, the light-emitting element substrate 200 and the rod lens array 220 have linear expansion coefficients differing from each other, their positions relative to each other change due to thermal expansion difference occurring upon environmental temperature changes. While positions of the light-emitting element substrate 200 and the rod lens array 220 relative to each other do not change at the fixed ends, positions of the light-emitting element substrate 200 and the rod lens array 220 relative to each other may change greatly at the free ends, particularly in the main scanning direction.

In the present embodiment, in a manner similar to first, second, and third embodiments, the exposure OLEDs 210 are arranged linearly on the light-emitting element substrate 200 as a single line in the main scanning direction or a plurality of lines in the main scanning direction in a staggered pattern. In a region on the light-emitting element substrate 200 closer in the main scanning direction to the free ends than a region where the exposure OLEDs 210 are arranged, the detection OLED 211 is arranged so as to be adjacent to the exposure OLEDs 210.

The detection OLED 211 may be arranged at, on the light-emitting element substrate 200, positions as illustrated in FIG. 8A, FIG. 8B, FIG. 9A, and FIG. 9B under a certain environmental condition. Further, when one of the exposure OLEDs 210 is used also as the detection OLED 211, the detection OLED 211 may be arranged at a position illustrated in FIG. 10.

The detection OLED 211 has the same image position as the exposure OLEDs 210. At a defocusing position that is more distant in the optical axis direction from the rod lens array 220 than the image position is arranged the light detector 500.

Optical intensity distribution detected by the light detector 500 varies in accordance with positions of the detection OLED 211 and the rod lens array 220 relative to each other. Accordingly, the control unit 107 or the driver IC 410 can calculate a position of the detection OLED 211 relative to the rod lens array 220 or a position of the rod lens array 220 relative to the detection OLED 211 from the detected optical intensity distribution.

In order to calculate a position of the detection OLED 211 relative to the rod lens array 220 or a position of the rod lens array 220 relative to the detection OLED 211, for example, pieces of optical intensity distribution data that the light detector 500 could possibly detect and a position of the detection OLED 211 relative to the rod lens array 220 or a position of the rod lens array 220 relative to the detection OLED 211 associated with the pieces of optical intensity distribution data (displacement amount in the main scanning direction) may be stored in advance. Further, the optical intensity distribution data detected by the light detector 500 is compared with the pieces of optical intensity distribution data prepared in advance, and the position of the detection OLED 211 relative to the rod lens array 220 or the position of the rod lens array 220 relative to the detection OLED 211 associated with the piece of optical intensity distribution data that the most resembles the detected optical intensity distribution data is selected as indicating the current position of the detection OLED 211 relative to the rod lens array 220 or the current position of the rod lens array 220 relative to the detection OLED 211.

For each of the exposure OLEDs 210, a position of the exposure OLED 210 relative to the rod lens array 220 is calculated by using the position of the detection OLED 211 relative to the rod lens array 220 and a ratio of a distance from the fixed ends to the exposure OLED 210 to a distance from the fixed ends to the detection OLED 211 under a certain environmental condition.

Accordingly, desired light amounts of the exposure OLEDs 210 can be corrected through: (i) storing in advance, for each position of the exposure OLED 210 relative to the rod lens array 220 (hereinafter referred to as a relative position of the exposure OLED 210), a correction value of the desired light amount of the exposure OLED 210; (ii) in advance to light exposure, calculating, for each of the exposure OLEDs 210, a relative position of the exposure OLED 210 through calculating a position of the detection OLED 211 relative to the rod lens array 220; and (iii) determining, for each of the exposure OLEDs 210, a correction value of the desired light amount from the calculated relative position of the exposure OLED 210.

For example, when a default distance from the fixed end to the detection OLED 211 is indicated as D0, the detected relative position of the detection OLED 211 as d0, and a default distance from the fixed ends to an exposure OLED 210 as D1, positional displacement amount d1 associated with the exposure OLED 210 is indicated by:

$$d1 = d0 \times D1/D0 \qquad (6)$$

That is, the detected relative position d0 and the positional displacement amount d1 associated with the exposure OLED 210 are in one-to-one correspondence. Accordingly, light exposure unevenness occurring due to changes in a position of the exposure OLED 210 relative to the rod lens array 220 can be accurately corrected through storing in advance, for each of the exposure OLEDs 210, a possible relative position d0, a correction value Cc of a desired light amount corresponding to the relative position d0, and a default desired light amount m0 and calculating, each time light exposure is performed, a desired light amount m1 from the default desired light amount m0 by using:

$$m1 = m0 \times Cc \qquad (7)$$

and thus forming of images with high quality is achieved.

Meanwhile, in order to prevent light emitted from the exposure OLEDs 210 and the detection OLED 211 from being shielded by dust or the like and defective light exposure and detection failure of a position of the light-emitting element substrate 200 relative to the rod lens array 220 or a position of the rod lens array 220 relative to the light-emitting element substrate 200 from occurring, the light-emitting element substrate 200 and the rod lens array 220 are covered with a holder (not illustrated) that prevents invasion of dust or the like. Further, although not entirely illustrated, the optical print head 100 includes all the necessary components that an optical print head needs to include, such as cables for connection to other devices in the image forming device 1.

Further, the detection OLED 211 may be arranged in a manner similar to Embodiment 1, Embodiment 2, and Embodiment 3 described above. When one or more of the exposure OLEDs 210 are used also as the detection OLED 211 in a manner similar to Embodiment 3 described above, the light detector 500 is retreated so that the light detector 500 does not prevent light P emitted from the exposure OLEDs 210 from reaching the outer circumferential surface of the photoreceptor drum 110 during light exposure. Further, when performing relative position detection, the light detector 500 is advanced between the rod lens array 220 and the outer circumferential surface of the photoreceptor drum 110 and detects intensity distribution of the light P emitted from the exposure OLED 210 that functions also as the detection OLED 211.

Conventional technology disclosed in Japanese Patent Application Publication No. 2006-62161 and Japanese Patent Application Publication No. 2006-62162 cannot perform relative position detection in the main scanning direction. Accordingly, after an optical print head in which positions of the light-emitting element substrate 200 and the rod lens array 220 relative to each other have been adjusted is mounted in an image forming device, positional displacement amounts cannot be detected when positions of the exposure OLEDs 210 and the rod lens array 221 on the light-emitting element substrate 200 relative to each other are displaced in the main scanning direction due to difference in linear expansion caused by temperature changes. Accordingly, it is impossible to prevent light exposure unevenness through correcting light amounts emitted from the exposure OLEDs 210 in accordance with positional displacement amounts.

Meanwhile, in an optical print head detecting light beam intensity distribution at the defocusing position such as the present embodiment, changes in a position in the main scanning direction of the light-emitting element substrate 200 relative to the rod lens array 220 or a position in the main scanning direction of the rod lens array 220 relative to the light-emitting element substrate 200 occurring due to difference in linear expansion caused by temperature change can be detected from changes in optical intensity distribution. Accordingly, light amount changes can be suppressed through performing light amount correction in accordance with the detection results.

[5] Modifications

Although description of the present invention has been provided with reference to embodiments of the present invention, the present invention should not be construed as being limited to the above embodiments, and the following modifications are possible.

(1) In the above embodiments, description is given taking cases in which optical intensity distribution is detected by using a CCD camera as examples. However, it goes without saying that the present invention should not be construed as being limited to this, and optical intensity distribution may be detected by using a light detector 500 other than a CCD camera.

(2) In the above embodiments, description is given taking cases in which the image forming device 1 is a tandem-type color printer as examples. However, it goes without saying that the present invention should not be construed as being limited to this, and the image forming device 1 may be a color printer device of types other than a tandem type or a monochrome printer instead of a tandem-type color printer. Further, the present invention achieves similar effects when applied to single-function peripherals such as copiers including a scanner device, facsimile devices having a communication function, and multi-function peripherals (MFPs) including all such functions.

<Summary>

The above embodiments and modifications represent one or more aspect of the present invention, and are summarized as in the following.

That is, a relative position detection method reflecting one aspect of the present invention is a relative position detection method detecting a position of a light-emitting member relative to a lens array or a position of the lens array relative to the light-emitting member, in which the light-emitting member includes a plurality of light-emitting elements arranged in a first direction and the lens array includes lenses arranged in the first direction and condenses light emitted from the light-emitting elements to image positions of the light-emitting elements, optical axes of the lenses being orthogonal to the first direction, the relative position detection method including: causing the light-emitting elements to emit light; performing light detection of detecting, at a position displaced from the image positions along an optical axis direction, optical intensity distribution of light emitted from the light-emitting elements and transmitted through the lens array; and performing position detection of detecting a position of the light-emitting member relative to the lens array or a position of the lens array relative to the light-emitting member with use of the detected optical intensity distribution.

In the relative position detection method, the optical intensity distribution may be detected at a position more distant along the optical axis direction from the lens array than the image positions.

In the relative position detection method, each gap between centers of adjacent ones of the lenses in the lens array may be d mm, arrangement positions of the light-emitting elements may be indicated by: $(d/2)/\cos 30°-(d/2)\times\cos 30°$ mm, and the position detection may detect whether or not one or more light-emitting elements are each at an equal distance from centers of three adjacent lenses in the lens array.

The relative position detection method may be performed with respect to two light-emitting elements, and a gap between the two light-emitting elements may be indicated by: $N\times d+(d/2)$ mm where N indicates an integer equal to or greater than 0.

The relative position detection method may be performed with respect to two or more light-emitting elements, and each gap between the two or more light-emitting elements may be indicated by: $N\times d$ mm where N indicates an integer equal to or greater than 1.

The relative position detection method may be performed by using light-emitting elements arrayed in a plurality of lines along the first direction.

An optical print head reflecting another aspect of the present invention includes at least: a light-emitting member in which a plurality of light-emitting elements are arranged in a first direction; a lens array in which lenses are arranged in the first direction and that condenses light emitted from the light-emitting elements to image positions of the light-emitting elements, optical axes of the lenses being orthogonal to the first direction; a fixing portion fixing the light-emitting member and the lens array; a light detection unit detecting, at a position displaced from the image positions along an optical axis direction, optical intensity distribution of light emitted from the light-emitting elements and transmitted through the lens array; and an adjustment unit adjusting light amounts from the light-emitting elements in accordance with the optical intensity distribution detected by the light detection unit. In the optical print head, light condensed at the image positions irradiates an irradiation target.

In the optical print head, the fixing portion may fix the lens array so that the lenses are in the optical axis direction and may fix the light-emitting member so that light from the light-emitting elements is emitted in the optical axis direction, and the light detection unit may detect light from the light-emitting member at a position opposite an arrangement position of the fixing portion.

In the optical print head, the light detection unit may perform the detection at a position more distant along the optical axis direction from the lens array than the image positions.

In the optical print head, the lenses of the lens array may be arranged so that each gap between centers of adjacent ones of the lenses is d mm, the light-emitting elements of the light-emitting member may be arranged at positions indicated by: $(d/2)/\cos 30°-(d/2)\times\cos 30°$ mm, and the light detection unit may detect optical intensity distribution of light emitted from a light-emitting element at a position at an equal distance from centers of three adjacent lenses in the lens array.

In the optical print head, the light detection unit may detect optical intensity distribution of two light-emitting elements, and a gap between the two light-emitting elements may be indicated by: $N\times d+(d/2)$ mm where N indicates an integer equal to or greater than 0.

In the optical print head, the light detection unit may detect optical intensity distribution of two or more light-emitting elements, and each gap between the two or more light-emitting elements may be indicated by: $N\times d$ mm where N indicates an integer equal to or greater than 1.

In the optical print head, the light detection unit may detect optical intensity distribution of light-emitting elements arrayed in a plurality of lines along the first direction.

An image forming device reflecting another aspect of the present invention includes an optical print head including at least: a light-emitting member in which a plurality of light-emitting elements are arranged in a first direction; a lens array in which lenses are arranged in the first direction and that condenses light emitted from the light-emitting elements to image positions of the light-emitting elements, optical axes of the lenses being orthogonal to the first direction; a fixing portion fixing the light-emitting member and the lens array; a light detection unit detecting, at a position displaced from the image positions along an optical axis direction, optical intensity distribution of light emitted from the light-emitting elements and transmitted through the lens array; and an adjustment unit adjusting light amounts from the light-emitting elements in accordance with the optical intensity distribution detected by the light detection unit. In the image forming device, light condensed at the image positions irradiates an irradiation target.

Further, a relative position detection method reflecting another aspect of the present invention is a relative position detection method detecting, with use of a light detecting unit, a position of an elongated light-emitting member relative to a rod lens array or a position of the rod lens array relative to the light-emitting member, the light-emitting member including a plurality of light-emitting elements arranged in a main scanning direction and the rod lens array including two or more rows of rod lenses arranged in the main scanning direction in a staggered pattern, the relative position detection method including: causing one or more of the light-emitting elements to emit light; performing light detection of detecting, with use of the light detecting unit, optical intensity distribution of the light emitted from the one or more of the light-emitting elements and transmitted through the rod lens array; and performing position detection of detecting, from the detected optical intensity distribution, (i) a position in the main scanning direction of the light-emitting member relative to the rod lens array; (ii) a position in the main scanning direction of the rod lens array relative to the light-emitting member (iii) a position in a sub scanning direction of the light-emitting member relative to the rod lens array; or (iv) a position in the sub scanning direction of the rod lens array relative to the light-emitting member. In the relative position detection method, the light detecting unit detects the optical intensity distribution through detecting two-dimensional distribution of intensity of the light at a detection position along an optical axis direction other than image positions of the light-emitting elements, the optical axis direction being parallel to optical axes of the rod lenses in the rod lens array.

This structure enables detection of a position of the light-emitting element substrate relative to the rod lens array or a position of the rod lens array relative to the light-emitting element substrate, irrespective of variance of diameters of the rod lenses.

In the relative position detection method, the detection position may be a position more distant along the optical axis direction from the rod lens array than the image positions.

In the relative position detection method, each gap between centers of adjacent ones of the rod lenses in the rod lens array in plan view from the optical axis direction may be d mm, the one or more of the light-emitting elements may each be spaced away along the sub scanning direction from a center line by a distance of: $(d/2)/\cos 30° - (d/2) \times \cos 30°$ mm, the center line extending in the main scanning direction and passing through a midpoint in the sub scanning direction of the light-emitting elements that are arranged in the main scanning direction, and the position detection may detect whether or not the one or more of the light-emitting elements are each at an equal distance from centers of three adjacent rod lenses in the rod lens array in plan view from the optical axis direction.

In the relative position detection method, each gap between centers of adjacent ones of the rod lenses in the rod lens array in plan view from the optical axis direction may be d mm, the one or more of the light-emitting elements may be two or more in number and may include at least one first light-emitting element and at least one second light-emitting element, the first light-emitting element may be arranged at a first side of the light-emitting member and the second light-emitting element may be arranged at a second side of the light-emitting member, the first side and the second side opposing each other in the sub scanning direction relative to a center line extending in the main scanning direction and passing through a midpoint in the sub scanning direction of the light-emitting elements that are arranged in the main scanning direction, the first light-emitting element and the second light-emitting element may be spaced away from the center line in the sub scanning direction by a distance of: $(d/2)/\cos 30° - (d/2) \times \cos 30°$ mm, each gap in the main scanning direction between ones of the two or more light-emitting elements that are adjacent to each other in the main scanning direction may be indicated as: $N \times d + (d/2)$ mm where N indicates an integer equal to or greater than 0, and the position detection may detect whether or not the two or more light-emitting elements are each at an equal distance from centers of three adjacent rod lenses in the rod lens array in plan view from the optical axis direction.

In the relative position detection method, each gap between centers of adjacent ones of the rod lenses in the rod lens array in plan view from the optical axis direction may be d mm, the one or more of the light-emitting elements may be two or more in number, the two or more light-emitting elements may be arranged at a same side of the light-emitting member in the sub scanning direction relative to a center line and are spaced away from the center line by a distance of: $(d/2)/\cos 30° - (d/2) \times \cos 30°$ mm, the center line extending in the main scanning direction and passing through a midpoint in the sub scanning direction of the light-emitting elements that are arranged in the main scanning direction, each gap in the main scanning direction between ones of the two or more light-emitting elements that are adjacent to each other in the main scanning direction may be indicated as: $N \times d$ mm where N indicates an integer equal to or greater than 1, and the position detection may detect whether or not the two or more light-emitting elements are each at an equal distance from centers of three adjacent rod lenses in the rod lens array in plan view from the optical axis direction.

In the relative position detection method, each gap between centers of adjacent ones of the rod lenses in the rod lens array in plan view from the optical axis direction may be d mm, the light-emitting elements may be arranged in a plurality of light-emitting element rows extending in the main scanning direction, the one or more of the light-emitting elements may be included in a light-emitting element row among the light-emitting element rows that is not arranged on a center line extending in the main scanning direction and passing through a midpoint in the sub scanning direction of the light-emitting elements that are arranged in the main scanning direction, and may each be spaced away in the sub scanning direction from the center line in the sub scanning direction of the light-emitting elements by a distance of: $(d/2)/\cos 30° - (d/2) \times \cos 30°$ mm, and the position detection may detect whether or not the one or more of the light-emitting elements are each at an equal distance from centers of three adjacent rod lenses in the rod lens array in plan view from the optical axis direction.

An optical print head reflecting another aspect of the present invention is an optical print head including an elongated light-emitting member in which a plurality of light-emitting elements are arranged in a main scanning direction and a rod lens array in which two or more rows of rod lenses are arranged in the main scanning direction in a staggered pattern, light emitted from the light-emitting elements irradiating an irradiation target, the optical print head further including: a supporting member fixed to a fixed portion of the light-emitting member and a fixed portion of the rod lens array; a light detection unit detecting optical intensity distribution of light emitted from one or more of the light-emitting elements that are arranged at a detection portion differing in the main scanning direction from the fixed portion at the light-emitting member and transmitted through the rod lens array; and an adjustment unit adjusting light amounts from the light-emitting elements in accordance with the optical intensity distribution detected by the light detection unit. In the optical print head, the light detecting unit detects the optical intensity distribution through detecting two-dimensional distribution of intensity of the light at a detection position along an optical axis direction other than image positions of the light-emitting elements, the optical axis direction being parallel to optical axes of the rod lenses in the rod lens array.

In the optical print head, the fixed portion of the light-emitting member may be an end in the main scanning direction of the light-emitting member, the fixed portion of the rod lens array may be an end in the main scanning direction of the rod lens array, and the detection portion of the light-emitting member may be close to the other end in the main scanning direction of the light-emitting member relative to the fixed portion.

In the optical print head, the detection position may be a position more distant along the optical axis direction from the rod lens array than the image positions.

In the optical print head, the rod lenses may be arranged in a staggered pattern so that each gap between centers of adjacent ones of the rod lenses in the rod lens array in plan view from the optical axis direction is d mm, and the detection portion may be spaced away along the sub scanning direction from a center line of the light-emitting elements that are arranged in the main scanning direction by a distance of: $(d/2)/\cos 30° - (d/2) \times \cos 30°$ mm, the center line extending in the main scanning direction and passing through a midpoint in the sub scanning direction of the light-emitting elements that are arranged in the main scanning direction, and the detection portion may be at an equal distance from centers of three adjacent rod lenses in the rod lens array in plan view from the optical axis direction.

In the optical print head, the one or more of the light-emitting elements may be two or more in number and may include at least one first light-emitting element and at least one second light-emitting element, the light detection unit may detect optical intensity distribution with respect to each of the two or more light-emitting elements, the first light-emitting element may be arranged at a first side of the light-emitting member and the second light-emitting element may be arranged at a second side of the light-emitting member, the first side and the second side opposing each other in the sub scanning direction relative to the center line, each gap in the main scanning direction between ones of the two or more light-emitting elements that are adjacent to each other in the main scanning direction may be indicated as: $N \times d + (d/2)$ mm where N indicates an integer equal to or greater than 0, and in plan view from the optical axis direction, the two or more light-emitting elements may each be at an equal distance from centers of three adjacent rod lenses in the rod lens array.

In the optical print head, the one or more of the light-emitting elements may be two or more in number, the light detection unit may detect optical intensity distribution with respect to each of the two or more light-emitting elements, the two or more light-emitting elements may be arranged at a same side of the light-emitting member in the sub scanning direction relative to the center line, each gap in the main scanning direction between ones of the two or more light-emitting elements that are adjacent to each other in the main scanning direction may be indicated as: $N \times d$ mm where N indicates an integer equal to or greater than 1, and in plan view from the optical axis direction, the two or more light-emitting elements may each be at an equal distance from centers of three adjacent rod lenses in the rod lens array.

In the optical print head, each gap between centers of adjacent ones of the rod lenses in the rod lens array in plan view from the optical axis direction may be d mm, the light-emitting elements may be arranged in a plurality of light-emitting element rows extending in the main scanning direction, and the one or more of the light-emitting elements may be included in a light-emitting element row among the light-emitting element rows that is not arranged on a center line extending in the main scanning direction and passing through a midpoint in the sub scanning direction of the light-emitting elements that are arranged in the main scanning direction, and may each be spaced away in the sub scanning direction from the center line in the sub scanning direction of the light-emitting elements by a distance of:

$$(d/2)/\cos 30° - (d/2) \times \cos 30° \text{ mm}.$$

An image forming device reflecting another aspect of the present invention includes an optical print head including an elongated light-emitting member in which a plurality of light-emitting elements are arranged in a main scanning direction and a rod lens array in which two or more rows of rod lenses are arranged in the main scanning direction in a staggered pattern, light emitted from the light-emitting elements irradiating an irradiation target, the optical print head further including: a supporting member fixed to a fixed portion of the light-emitting member and a fixed portion of the rod lens array; a light detection unit detecting optical intensity distribution of light emitted from one or more of the light-emitting elements that are arranged at a detection portion differing in the main scanning direction from the fixed portion at the light-emitting member and transmitted through the rod lens array; and an adjustment unit adjusting light amounts from the light-emitting elements in accordance with the optical intensity distribution detected by the light detection unit. In the image forming device, the light detecting unit detects the optical intensity distribution through detecting two-dimensional distribution of intensity of the light at a detection position along an optical axis direction other than image positions of the light-emitting elements, the optical axis direction being parallel to optical axes of the rod lenses in the rod lens array.

Although one or more embodiments of the present invention have been described and illustrated in detail, the disclosed embodiments are made for the purposes of illustration and example only and not limitation. The scope of the present invention should be interpreted by the terms of the appended claims.

What is claimed is:

1. A relative position detection method detecting a position of a light-emitting member relative to a lens array or a position of the lens array relative to the light-emitting member, wherein the light-emitting member includes a plurality of light-emitting elements arranged in a first direction and the lens array includes lenses arranged in the first direction and condenses light emitted from the light-emitting elements to image positions of the light-emitting elements, optical axes of the lenses being orthogonal to the first direction, wherein the light-emitting member and the lens array are part of optical print head for use in an image forming device comprising a photoreceptor drum, the relative position detection method comprising:
    causing the light-emitting elements to emit light;
    performing light detection of detecting via a light detector, at a position displaced from the image positions along an optical axis direction, optical intensity distribution of light emitted from the light-emitting elements and transmitted through the lens array, the light detector having a tip end closest to the lens array, the image positions being located along the optical axis between the lens array and the tip end;
    performing position detection of detecting a position of the light-emitting member relative to the lens array or a position of the lens array relative to the light-emitting member with use of the detected optical intensity distribution; and
    adjusting a relative position of the light-emitting member and the lens array by moving a suction holding jig holding the light-emitting member in a main scanning direction and a sub scanning direction,
    wherein a distance between the lens array and the image positions is approximately equal to a distance between the lens array and a surface of the photoreceptor drum in the image forming device,
    wherein the light emitting elements are TFT circuits disposed at a glass substrate, with the glass substrate disposed between the TFT circuits and the lens, and
    wherein the suction holding jig is disposed below the light-emitting member in the optical axis such that an upper surface of the suction holding jig is coupled to a lower surface of the light-emitting member.

2. The relative position detection method of claim 1, wherein
    the optical intensity distribution is detected at a position more distant along the optical axis direction from the lens array than the image positions.

3. The relative position detection method of claim 1, wherein
    each gap between centers of adjacent ones of the lenses in the lens array is d mm,
    arrangement positions of the light-emitting elements are defined by:

$(d/2)/\cos 30° - (d/2) \times \cos 30°$ mm, and the position detection detects whether or not one or more light-emitting elements are each at an equal distance from centers of three adjacent lenses in the lens array.

4. The relative position detection method of claim 3, wherein
    the relative position detection method is performed with respect to two light-emitting elements, and
    a gap between the two light-emitting elements is defined by:

$N \times d + (d/2)$ mm where N indicates an integer equal to or greater than 0.

5. The relative position detection method of claim 3, wherein
    the relative position detection method is performed with respect to two or more light-emitting elements, and
    each gap between the two or more light-emitting elements is defined by:

$N \times d$ mm where N indicates an integer equal to or greater than 1.

6. The relative position detection method of claim 3, wherein
    the relative position detection method is performed by using light-emitting elements arrayed in a plurality of lines along the first direction.

7. An optical print head for use in an image forming device comprising a photoreceptor drum, comprising at least:
    a light-emitting member in which a plurality of light-emitting elements are arranged in a first direction;
    a lens array in which lenses are arranged in the first direction and that condenses light emitted from the light-emitting elements to image positions of the light-emitting elements, optical axes of the lenses being orthogonal to the first direction;
    a fixing portion fixing the light-emitting member and the lens array;
    a light detection unit detecting, at a position displaced from the image positions along an optical axis direction, optical intensity distribution of light emitted from the light-emitting elements and transmitted through the lens array, the light detection unit having a tip end closest to the lens array, the image positions being located along the optical axis between the lens array and the tip end;
    an adjustment unit adjusting light amounts from the light-emitting elements in accordance with the optical intensity distribution detected by the light detection unit, wherein
    light condensed at the image positions irradiates an irradiation target; and
    a suction holding jig which holds the light-emitting member and moves in a main scanning direction and a sub scanning direction to adjust a relative position of the light-emitting member and the lens array,
    wherein a distance between the lens array and the image positions is approximately equal to a distance between the lens array and a surface of the photoreceptor drum in the image forming device,
    wherein the light emitting elements are TFT circuits disposed at a glass substrate, with the glass substrate disposed between the TFT circuits and the lens, and
    wherein the suction holding jig is disposed below the light-emitting member in the optical axis such that an upper surface of the suction holding jig is coupled to a lower surface of the light-emitting member.

8. The optical print head of claim 7, wherein
    the fixing portion fixes the lens array so that the lenses are in the optical axis direction and fixes the light-emitting member so that light from the light-emitting elements is emitted in the optical axis direction, and the light detection unit detects light from the light-emitting member at a position opposite an arrangement position of the fixing portion.

9. The optical print head of claim 7, wherein
the light detection unit performs the detection at a position more distant along the optical axis direction from the lens array than the image positions.

10. The optical print head of claim 7, wherein
the lenses of the lens array are arranged so that each gap between centers of adjacent ones of the lenses is d mm,
the light-emitting elements of the light-emitting member are arranged at positions defined by:

$(d/2)/\cos 30° - (d/2) \times \cos 30°$ mm, and the light detection unit detects optical intensity distribution of light emitted from a light-emitting element at a position at an equal distance from centers of three adjacent lenses in the lens array.

11. The optical print head of claim 10, wherein
the light detection unit detects optical intensity distribution of two light-emitting elements, and
a gap between the two light-emitting elements is defined by:

$N \times d + (d/2)$ mm where N indicates an integer equal to or greater than 0.

12. The optical print head of claim 10, wherein
the light detection unit detects optical intensity distribution of two or more light-emitting elements, and
each gap between the two or more light-emitting elements is defined by:

$N \times d$ mm where N indicates an integer equal to or greater than 1.

13. The optical print head of claim 10, wherein
the light detection unit detects optical intensity distribution of light-emitting elements arrayed in a plurality of lines along the first direction.

14. An image forming device comprising:
a photoreceptor drum;
an optical print head including at least:
   a light-emitting member in which a plurality of light-emitting elements are arranged in a first direction;
   a lens array in which lenses are arranged in the first direction and that condenses light emitted from the light-emitting elements to image positions of the light-emitting elements, optical axes of the lenses being orthogonal to the first direction, the light detection unit having a tip end closest to the lens array, the image positions being located along the optical axis between the lens array and the tip end;
   a fixing portion fixing the light-emitting member and the lens array;
   a light detection unit detecting, at a position displaced from the image positions along an optical axis direction, optical intensity distribution of light emitted from the light-emitting elements and transmitted through the lens array;
   an adjustment unit adjusting light amounts from the light-emitting elements in accordance with the optical intensity distribution detected by the light detection unit; and
   a suction holding jig which holds the light-emitting member and moves in a main scanning direction and a sub scanning direction to adjust a relative position of the light-emitting member and the lens array,
wherein
light condensed at the image positions irradiates an irradiation target;
   wherein a distance between the lens array and the image positions is approximately equal to a distance between the lens array and a surface of the photoreceptor drum in the image forming device,
   wherein the light emitting elements are TFT circuits disposed at a glass substrate, with the glass substrate disposed between the TFT circuits and the lens, and
   wherein the suction holding jig is disposed below the light-emitting member in the optical axis such that an upper surface of the suction holding jig is coupled to a lower surface of the light-emitting member.

* * * * *